(12) United States Patent
Marquez (10) Patent No.: US 9,556,690 B1
(45) Date of Patent: Jan. 31, 2017

(54) ELEVATOR LINK EXTENSION SYSTEMS (71) Applicant: Alpha Dog Oilfield Tools, Laredo, TX (US)

(72) Inventor: Manuel Marquez, Laredo, TX (US)

(73) Assignee: Alpha Dog Oilfield Tools, Laredo, TX (US)

( * ) Notice: Subject to any disclaimer, the term of this patent is extended or adjusted under 35 U.S.C. 154(b) by 0 days.

(21) Appl. No.: 14/919,635

(22) Filed: Oct. 21, 2015

Related U.S. Application Data (60) Provisional application No. 62/161,148, filed on May 13, 2015.

(51) Int. Cl.
  *E21B 19/06* (2006.01)
  *E21B 19/16* (2006.01)
  *E21B 3/02* (2006.01)
  *F16C 11/04* (2006.01)

(52) U.S. Cl.
  CPC ............... *E21B 19/16* (2013.01); *E21B 3/02* (2013.01); *E21B 19/06* (2013.01); *F16C 11/045* (2013.01)

(58) Field of Classification Search
  CPC ............ E21B 19/06; E21B 19/16; E21B 3/02; F16C 11/045
  USPC ........................................................ 166/379
  See application file for complete search history.

(56) References Cited

U.S. PATENT DOCUMENTS

| | | | |
|---|---|---|---|
| 2,242,783 A | 5/1941 | Grau | |
| 3,461,666 A | 8/1969 | Burstall | |
| 4,793,422 A | 12/1988 | Krasnov | |
| 4,800,968 A | 1/1989 | Shaw et al. | |
| 6,520,709 B1 * | 2/2003 | Mosing | B66C 1/66 403/300 |
| 6,679,333 B2 * | 1/2004 | York | E21B 19/16 166/379 |
| 6,832,658 B2 * | 12/2004 | Keast | E21B 3/02 166/77.52 |
| 6,920,926 B2 * | 7/2005 | York | E21B 19/16 166/77.1 |
| 7,140,443 B2 * | 11/2006 | Beierbach | E21B 19/16 166/380 |
| 7,350,586 B2 * | 4/2008 | Guidry | E21B 19/06 166/380 |
| 7,377,324 B2 * | 5/2008 | Beierbach | E21B 19/06 166/380 |
| 7,770,654 B2 * | 8/2010 | Beierbach | E21B 19/06 166/380 |
| 8,191,621 B2 * | 6/2012 | Sweeney | E21B 19/06 166/77.52 |
| 8,356,674 B2 * | 1/2013 | Murray | E21B 19/07 166/380 |

(Continued)

FOREIGN PATENT DOCUMENTS

EP 0079846 A1 5/1983

OTHER PUBLICATIONS

ALCO, ALCO Elevator Link Connectors, Product Brochure, Date of Publication Unknown.

(Continued)

*Primary Examiner* — Matthew R Buck
(74) *Attorney, Agent, or Firm* — Volk & McElroy, LLP; Michael D. Volk, Jr.

(57) ABSTRACT

In the field of well drilling, a bail link extender device connected to a drilling rig enabling the working length of an elevator links to be extended.

15 Claims, 5 Drawing Sheets

(56) References Cited

U.S. PATENT DOCUMENTS

| | | | |
|---|---|---|---|
| 2013/0105168 A1* | 5/2013 | Overland | E21B 19/07 166/352 |
| 2013/0202346 A1* | 8/2013 | Hodging | B66C 3/005 403/113 |
| 2014/0090856 A1* | 4/2014 | Pratt | E21B 19/16 166/380 |

OTHER PUBLICATIONS

ALCO, Bail Extensions, http://alcoinc.ca/Products/Oil%20Field/HandlingTools/BailExtension/BailExtension.htm, Internet publication dated Dec. 3, 2014.

* cited by examiner

ELEVATOR LINK EXTENSION SYSTEMS

CROSS-REFERENCE TO RELATED APPLICATIONS

This application claims the benefit of U.S. Provisional Patent Application No. 62/161,148, filed May 13, 2015, entitled "Bail Extender Systems".

DETAILED DESCRIPTION

The present disclosure relates to elevator link extension systems used in well drilling apparatus. More particularly, the present disclosure relates to enabling the working length of elevator links to be adjusted during drilling and casing operations.

In production-well drilling operations, various handling apparatus are used to manipulate the casing, drill pipe, or other drill string components. Elevators are used to raise and lower casing, drill pipe, or other drill string components in a well bore. Elevator links (also referred to as bails) are used to suspend the elevator from a top-drive unit or other traveling support assembly of the drill rig. Traditional bails take the form of an elongated shank having eye-shaped loops on opposite ends of the bail, or link. The upper loop of each bail is connected to a traveling block or vertically-movable top-drive unit of the rig. The lower loop of each bail is secured to the elevator. In some operations, the lower loop of each bail may be secured to an extension bail (or bail extension), which is used to extend the working distance between the top-drive unit and the lower handling apparatus engaging the drill string or casing. Extension bails have an eye-shaped loop on one end of the extension bail and a fixed-jaw clevis-shaped structure at the opposing end. Such elevator links and extension bails customarily comprise a single piece of forged steel and are formed in set lengths and support capacities.

The required working distance between the lower handling apparatus and upper top drive assembly often varies with the drilling and equipment requirements of a particular job or undertaking. For example, longer elevator links are often required during cementing procedures to develop sufficient clearance for the cementing head under the pipe-handling apparatus of the top-drive unit. If a change to the working distance is required, the rig crew must remove and replace the primary rig bails with longer units or install a set of secondary extension bails to the primary rig bails already in place. Although change-out of elevator bails is a normal operation routinely performed during the course of drilling a well, such conventional adjustment procedures consume valuable time and create additional hazards to the rig personnel performing the work. Such hazards include injury during installation of the primary bails or secondary bail extensions. Any delays or lost time during drilling operations negatively impacts the overall cost to drill and complete a well. Furthermore, popular lengths and tonnage capacities of standard commercial bails are frequently in shortage, thus creating delays in scheduling of critical drilling operations.

The present disclosure relates to elevator link extension systems. Such elevator link extension systems extend the effective working length of a drilling rig bail using a linking device between a primary rig bail and a secondary extension bail. In an example implementation, a Y-shaped linking device is used to connect a primary rig bail to an extender bail. The Y-shaped linking device comprises an upper end where the eye-shaped loop of the shank of a traditional bail sits. Apertures in the upper end of the Y-shaped linking device receive a securing device that also passed through the eye-shaped loop of the shank of the traditional bail. The securing device is locked in place. The lower part of the Y-shaped linking device comprises a projection with an aperture. A traditional bail extender has two side members that surround the lower portion of the Y-shaped device. A securing device passes through apertures in the traditional bail extender and in the lower part of the Y-shaped linking device. The Y-shaped linking device has a length that when added to the traditional bail and bail extender extends the length of the elevator assembly essentially the length of the Y-shaped linking device. By attaching the Y-shaped linking device, the effective working length of the drilling rig bail system is extended. An additional benefit of attaching the Y-shaped linking device is facilitating the alignment of pipe segments to reduce cross-threading of pipe couplings during drilling operations.

Figures 1, 2:
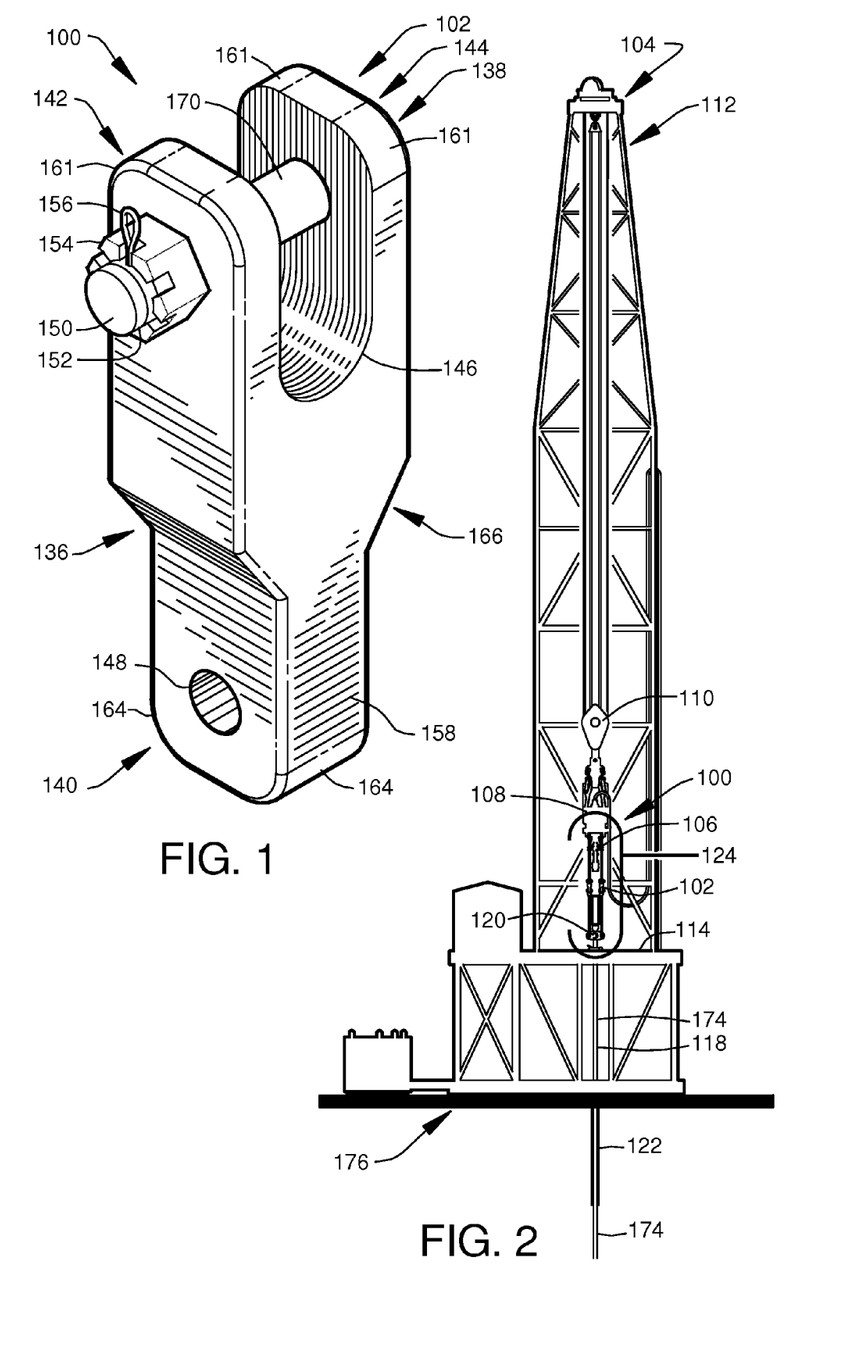
FIG. 1 shows a perspective view illustrating a bail extender device according to an embodiment of the present disclosure.
FIG. 2 is a schematic diagram illustrating a drilling rig having a pipe-handling apparatus that has been modified to comprise the bail extender device of FIG. 1.

FIG. 1 illustrates an example implementation of an elevator link extension system 100. More particularly, FIG. 1 shows a perspective view illustrating an example implementation of bail extender device 102. FIG. 2 is a diagram illustrating drilling rig 104 comprising a pipe-handling apparatus 106 which has been modified to comprise bail extender device 102. The depicted drilling rig 104 of FIG. 2 comprises a conventional top-driven design having a top-drive unit 108 suspended from traveling block 110 of derrick 112, as shown. Common top-drive units 108 comprise integrated pipe handling and hoisting capabilities and are configured to move up and down derrick 112 relative to rig floor 114, as best shown in FIG. 3.

Figure 3:
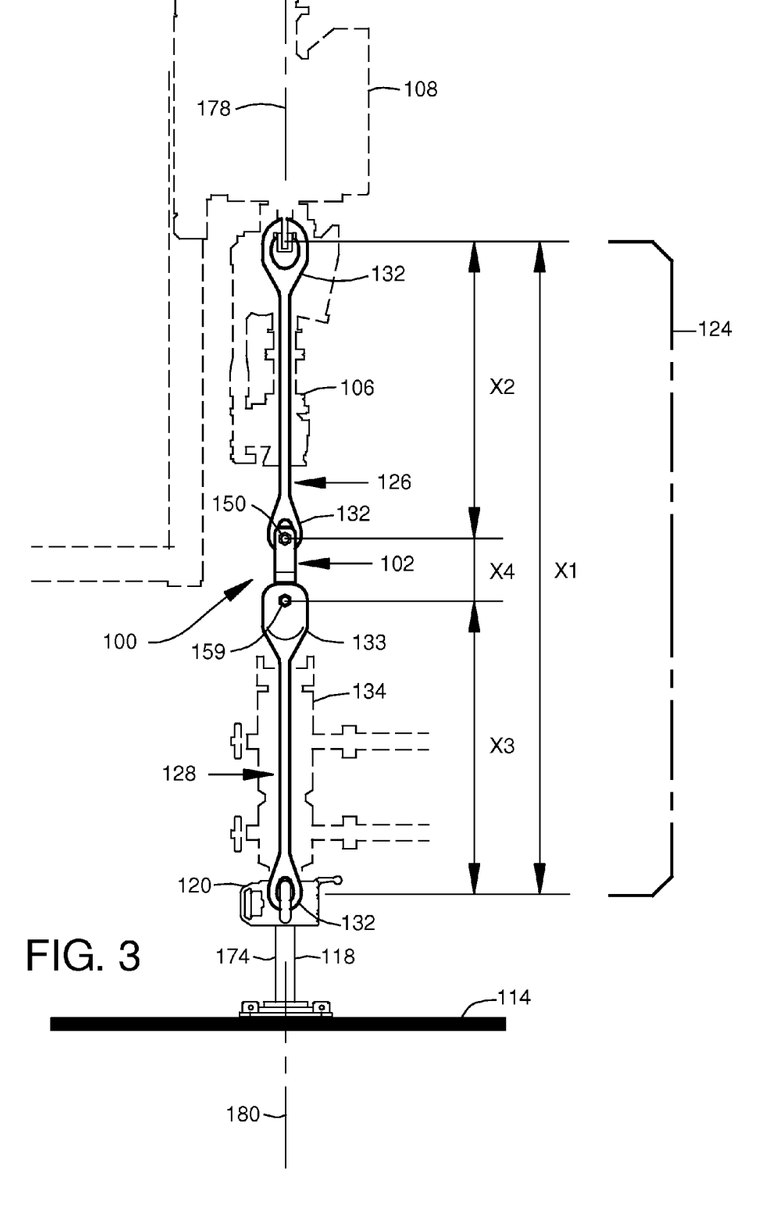
FIG. 3 is a side view, magnified for clarity, of the modified pipe-handling apparatus of the drilling rig of FIG. 2

FIG. 3 is a side view, magnified for clarity, of the modified pipe-handling apparatus 106 of drilling rig 104 of FIG. 2. Various types of components are employed to manipulate drill pipe or casing 118. In FIG. 3, elevator 120 of pipe-handling apparatus 106 is shown supporting a stand of casing 118. Elevator 120 is used to raise, lower, and support casing 118 in well bore 122 (see FIG. 2). An elevator-bail assembly 124 comprising bail extender device 102 suspends elevator 120 from top-drive unit 108, as shown.

Figures 4, 5:
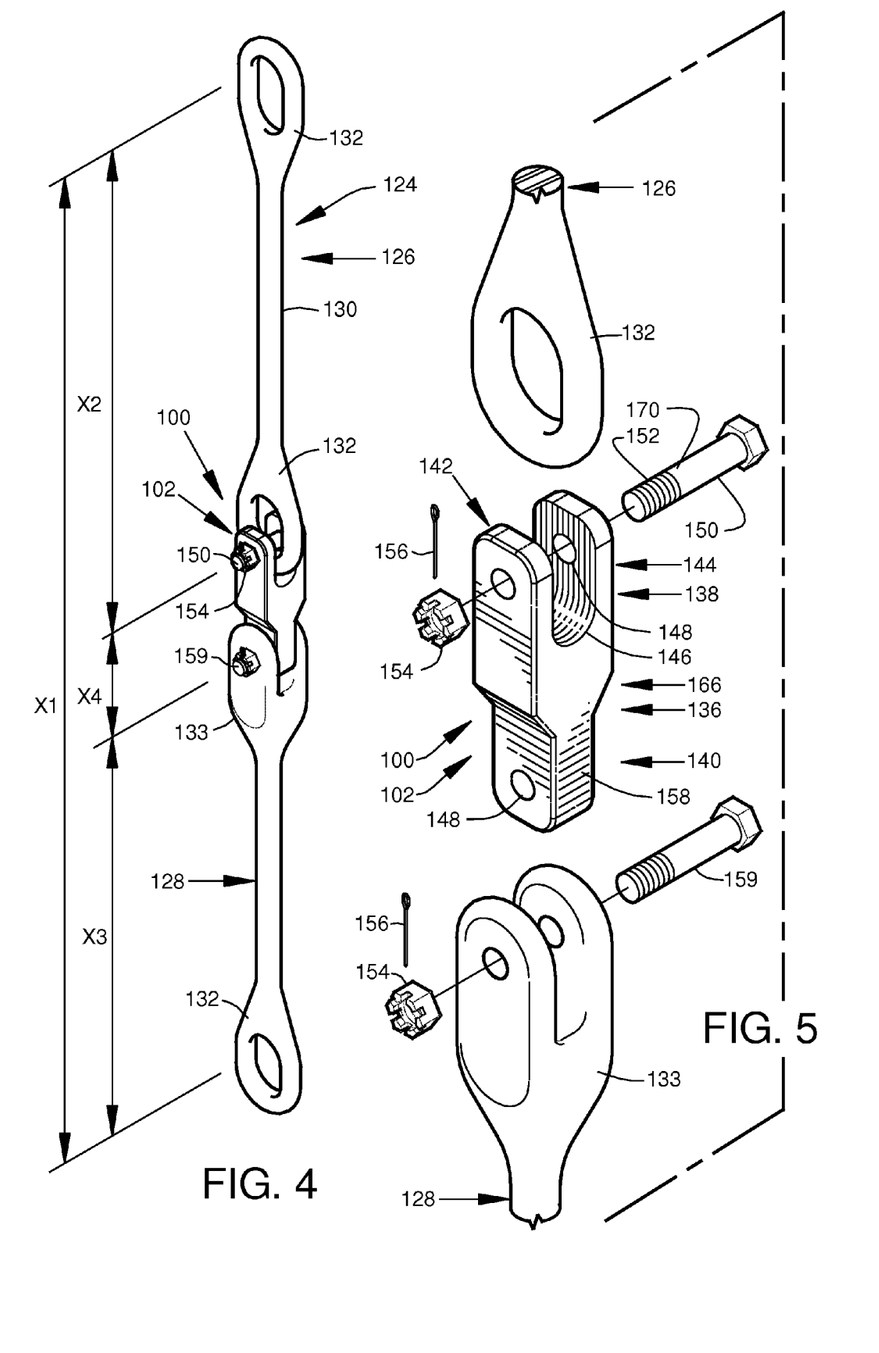
FIG. 4 shows an isolated perspective view illustrating an elevator-bail assembly of the modified pipe-handling apparatus of the drilling rig of FIG. 2.
FIG. 5 shows an exploded perspective view illustrating sub-components of the elevator-bail assembly including the bail extender device of FIG. 1.

FIG. 4 shows a perspective view illustrating one side of elevator-bail assembly 124 of the depicted pipe-handling apparatus. With continued reference to FIG. 1 through FIG. 3, elevator-bail assembly 124 preferably comprises a set of primary elevator bails 126 (also referred to as elevator links) and a set of secondary extension bails 128, as shown. Traditional elevator bails 126 comprise an elongated shank 130 having eye-shaped loops 132 on the opposite ends of the bails. Conventional extension bails 128 are of similar design, but comprise a single eye-shaped loop 132 on one end and a bail coupler 133 on the opposing end. Bail coupler 133 of extension bail 128 is a fixed jaw clevis shaped structure (also referred to as a U-shaped receiver) enabling extension bail 128 to be coupled to loop 132 during conventional use.

Both the primary elevator bails 126 and secondary extension bails 128 customarily comprise a single piece of forged steel and are supplied in fixed lengths. The most commonly supplied lengths of commercially-available bails are 10 feet, 18 feet, and 22 feet. Each set of bails within elevator-bail assembly 124 is designed and constructed to meet a specific minimum support capacity, such as being capable of supporting 350 tons, 500 tons, 750 tons, etc. Larger elevator bails may weigh several thousand pounds each and require particular caution during handling.

The required working distance X1 between the lower handling apparatus (in this example, elevator 120) and upper top-drive unit 108 often varies with the drilling and equipment requirements of a particular job or undertaking. For example, longer bails are often required during cementing procedures to develop sufficient clearance for cementing head 134 under pipe-handling apparatus 106 of the top-drive unit 108. If an increase of working distance X1 is required, the rig crew must often remove and replace the primary rig bails with longer units. In some cases, a set of secondary extension bails 128 can be added to the primary rig bails already in place. As an example, many conventional cementing heads 134 require an increased working distance X1 of 22 feet between top-drive unit 108 and elevator 120 supporting casing 118. Such 22-foot working distance X1 cannot be generated by joining a standard-length extension bail 128 and standard-length primary elevator bail 126 alone. In such cases, the removal and exchange of the primary rig bails is necessary. This takes additional working time and creates additional hazards to the rig personnel performing the work. This opens up rig personnel to occupational hazards and bodily, such as for, example, pinching of fingers and hands because the primary rig bail must be positioned and secured.

Bail extender device 102 enables generation of non-standard working distances using standard-length primary elevator bails 126 and secondary extension bails 128. In the depicted elevator-bail assembly 124 of FIG. 4, primary elevator bail 126 comprises a standard length X2 of 10 feet and extension bail 128 comprises a standard length X3 of 10 feet. If joined together in a customary manner, the combined length of primary elevator bail 126 and the secondary extension bail 128 is insufficient to achieve the needed 22-foot working distance. In an example implementation, bail extender device 102 adds an additional length X4 of about 2 feet to produce the required working distance X1 of 22 feet when coupled to the primary elevator bails 126 and the secondary extension bails 128, as shown. Thus, bail extender device 102 allows the development of such non-standard working distances without the cost and risk associated with changing-out the primary elevator bails 126. It should be noted that the elevator bail assembly 124 is customarily installed on both sides of the pipe-handling apparatus 106 and on both sides of the elevator 120. Thus, in a typical rig configuration depicted in FIG. 2 and FIG. 3, two of bail extender device 102 are used. Depending on the circumstances, other numbers of bail extender devices may be used.

FIG. 5 shows an exploded perspective view, illustrating sub-components of elevator-bail assembly 124, including bail extender device 102. According to an example implementation of the present disclosure, bail extender device 102 connects elevator bail 126 with extension bail 128 in the manner shown in FIG. 4. In reference to both FIG. 1 and FIG. 5, bail extender device 102 is shown as unitary body 136 having a first coupler portion 138 that couples bail extender device 102 to the lower eye-shaped loop 132 of the primary elevator bail 126 and a second coupler portion 140 that couples bail extender device 102 to bail coupler 133 of extension bail 128.

According to an example implementation of the present disclosure, first coupler portion 138 is shown with first arm 142 (a projecting side member/channel flanking member) and second arm 144 (a projecting side member/channel flanking member) arranged in a spaced apart relationship. U-shaped throat 146 (or channel) is defined between first arm 142 and second arm 144 for receiving the lower eye-shaped loop 132 of the primary elevator bail 126. First arm 142 and second arm 144 are arranged in a parallel orientation and are each provided with transverse bores 148 aligned coaxially for receiving retaining pin 150 or a similar rigid retaining member. Specifically, retaining pin 150 is passed through aligned coaxial bores 148 such that retaining pin 150 spans throat 146 between first arm 142 and second arm 144. Retaining pin 150 cooperates with the U-shaped throat 146 to form a closed loop enabling the eye-shaped loop 132 of the primary elevator bail 126 to be securely captured therein, as best shown in FIG. 4. In an example implementation, retaining pin 150 includes an externally threaded portion 152 configured to receive an internally-threaded nut 154, or similar retainer, as shown. In an example implementation, externally threaded portion 152 and nut 154 are adapted to receive a cotter pin 156. In such an arrangement, nut 154 may be of a castellated design.

In the example implementation shown in FIG. 5, second coupler portion 140 is illustrated as a single elongated member 158 extending away from first coupler portion 138. Single elongated member 158 couples second coupler portion 140 to bail coupler 133 of elevator extension bail 128. More specifically, elongated member 158 engages the female receiver of bail extension coupler 133. In addition, elongated member 158 comprises a transverse bore 148 for receiving a standard retaining bolt 159 of bail extension coupler 133. Bail extension coupler 133 has a fixed-jaw clevis-shaped structure. Single elongated member 158 engages bail extension coupler 133 with a male-female style connection.

In accordance with an example implementation of the present disclosure, bail extender device 102 adds additional distance X4 of about two feet to the overall length of elevator-bail assembly 124, thus allowing elevator-bail assembly 124 to service various elevators, cementing heads, test equipment, etc.

Figure 6:
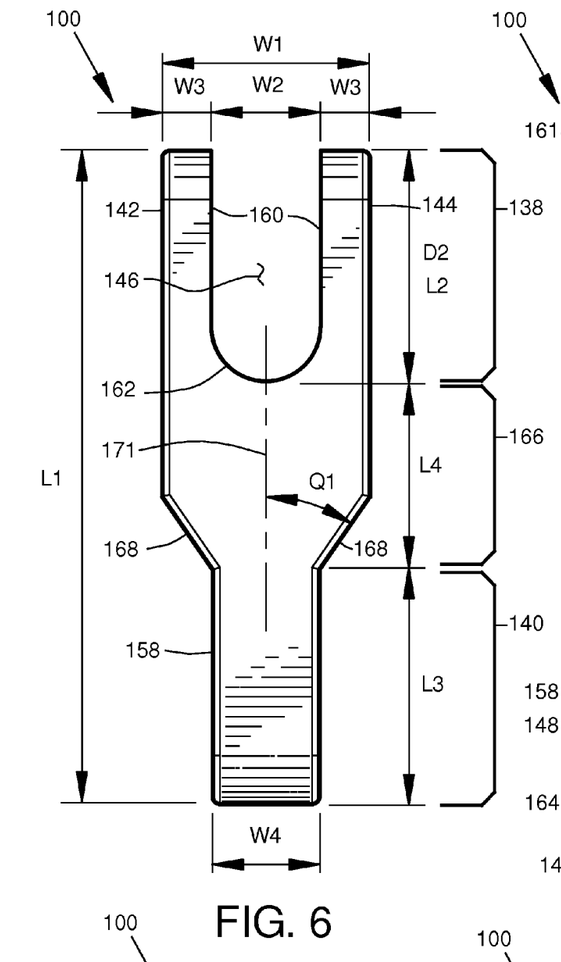
FIG. 6 shows a front view of the bail extender device of FIG. 1.

FIG. 6 shows a front view of bail extender device 102. For clarity of description, the preferred geometric arrangement of unitary body 136 will be sub-divided into three principal portions, identified herein as first coupler portion 138, second coupler portion 140, and transition portion 166.

In an example implementation, unitary body 136 of bail extender device 102 can be symmetrical about longitudinal axis 171, as shown. Dimensions of an example implementation of bail extender device 102 will now be discussed. Bail extender device 102 may have an overall length L1 of about 34 inches (86.4 cm) and an overall width W1 of about 10 and ¾ inches (27.3 cm). The longitudinal length L2 of first coupler portion 138 will be defined by the depth of throat 146. In that regard, throat 146 of first coupler portion 138 may have a depth D2 of about 12 inches (30.5 cm). The transverse width W2 of throat 146 is about 5 and ¾ inches (14.6 cm). First arm 142 and second arm 144 of first coupler portion 138 may each comprise a distal width W3 of about 2 and ½ inches (6.4 cm). To reduce stress risers within the device, the planar inner wall 160 of first arm 142 smoothly transitions to the planar inner wall 160 of second arm 144 along uniform radius 162, as shown. The furthermost portion of first coupler portion 138 defines a first end. An opening in the first end transitions into throat 146 (also referred to as a channel).

Second coupler portion 140 may have preferred length L3 of about 12 inches (30.5 cm), a reduced transverse width W4 of about 4 and ⅝ inches (11.7 cm). Second coupler portion 140 is shown integrally coupled to first coupler portion 138 at transition portion 166. Transition portion 166 may have a length L4 of about 10 inches (25.4 cm). To reduce stress risers and facilitate handling of the device, transition portion 166 is shown with a set of symmetrically angled outer walls 168 that taper from width W4 at first coupler portion 138 to transverse width W4 at second coupler portion 140, as shown. Each planar face of outer walls 168 has an angle Q1 that may be about 35 degrees relative to longitudinal axis 171. The furthermost portion of second coupler portion 140 defines a second end. The overall length L1 of unitary body 136 is measured from the furthermost portion of first coupler portion 138 and the furthermost portion of second coupler portion 140, as shown in FIG. 6.

Figure 7:
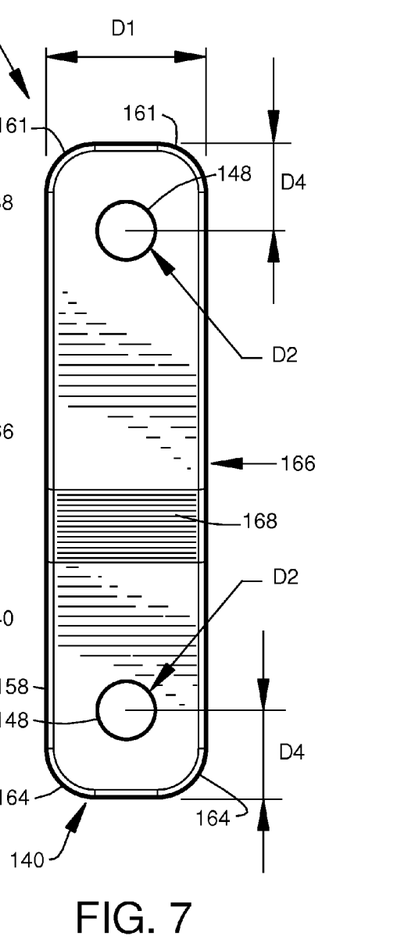
FIG. 7 shows a side view of the bail extender device of FIG. 1.
Figures 8, 9:
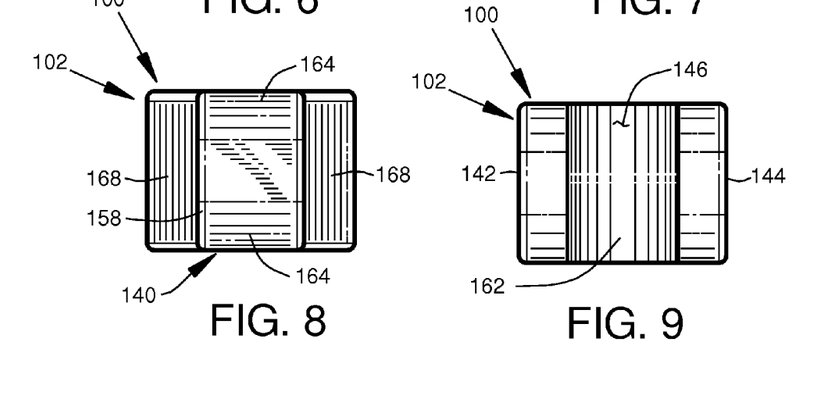
FIG. 8 shows a bottom view of the bail extender device of FIG. 1.
FIG. 9 shows a top view of the bail extender device of FIG. 1.

FIG. 7 shows a side view of bail extender device 102. FIG. 8 shows a bottom view of bail extender device 102. FIG. 9 shows a top view of bail extender device 102. Referring to the side view of FIG. 7, bail extender device 102 may have a depth D1 of about 8 and ¼ inches (21 cm). The distal ends of first arm 142 and second arm 144 (see also FIG. 6) of first coupler portion 138 may each have two outer radius transitions 161 to assist handling and enhance safety during use. The distal end of second coupler portion 140 also may have two outer transition radiuses 164 to assist handling and enhance safety during use. Upon reading the teachings of this specification, those of ordinary skill in the art will now understand that, under appropriate circumstances, extended or reduced lengths, extended or reduced widths, extended or reduced depths, etc., may suffice.

In commercial settings, each bail extender device 102 may be supplied with at least one retaining pin 150 (see FIG. 1 and FIG. 5). The shaft 170 of retaining pin 150 may have an outer diameter of about 3 inches (7.6 cm). Each bore 148 may have an inner diameter D2 that is sized to produce a medium to loose sliding fit around retaining pin 150 (a clearance of about 0.25 inch) to permit manual assembly and disassembly of the retainer. Each bore 148 is centered on the planar side face a distance D4 of about 4 and ½ inches (10.2 cm) from respective ends, as shown.

Bail extender device 102 may be constructed from a single material having both rigid and durable material properties. In one example implementation, bail extender device 102 is constructed from steel. A high-strength alloy steel may be used and bail extender device 102 may be formed by a casing process. According to another example implementation, bail extender device 102 may be forged from a single billet of high strength alloy steel. After casing or forging, the device may be heat treated using one or more well-known processes to provide maximum strength and toughness.

Bail extender devices made pursuant to the present disclosure should support loads at least equaling the load capacities of the elevator bails forming an elevator-bail assembly 124. For example, if the primary elevator bails 126 and the secondary elevator extension bails 128 forming elevator-bail assembly 124 comprise 350-ton load capacities, bail extender device 102 would also be rated for a 350-ton load. Preferred load ratings include 250, 350, 500, 750, 1000 and 1250 ton capacities. Other load ratings may suffice as well.

Bail extender devices made pursuant to the present disclosure should also meet Specification 8C of the American Petroleum Institute (API) for drilling and production hoisting equipment. Such bail extender devices should be load tested prior to delivery to assure in-service performance.

Figures 10, 11:
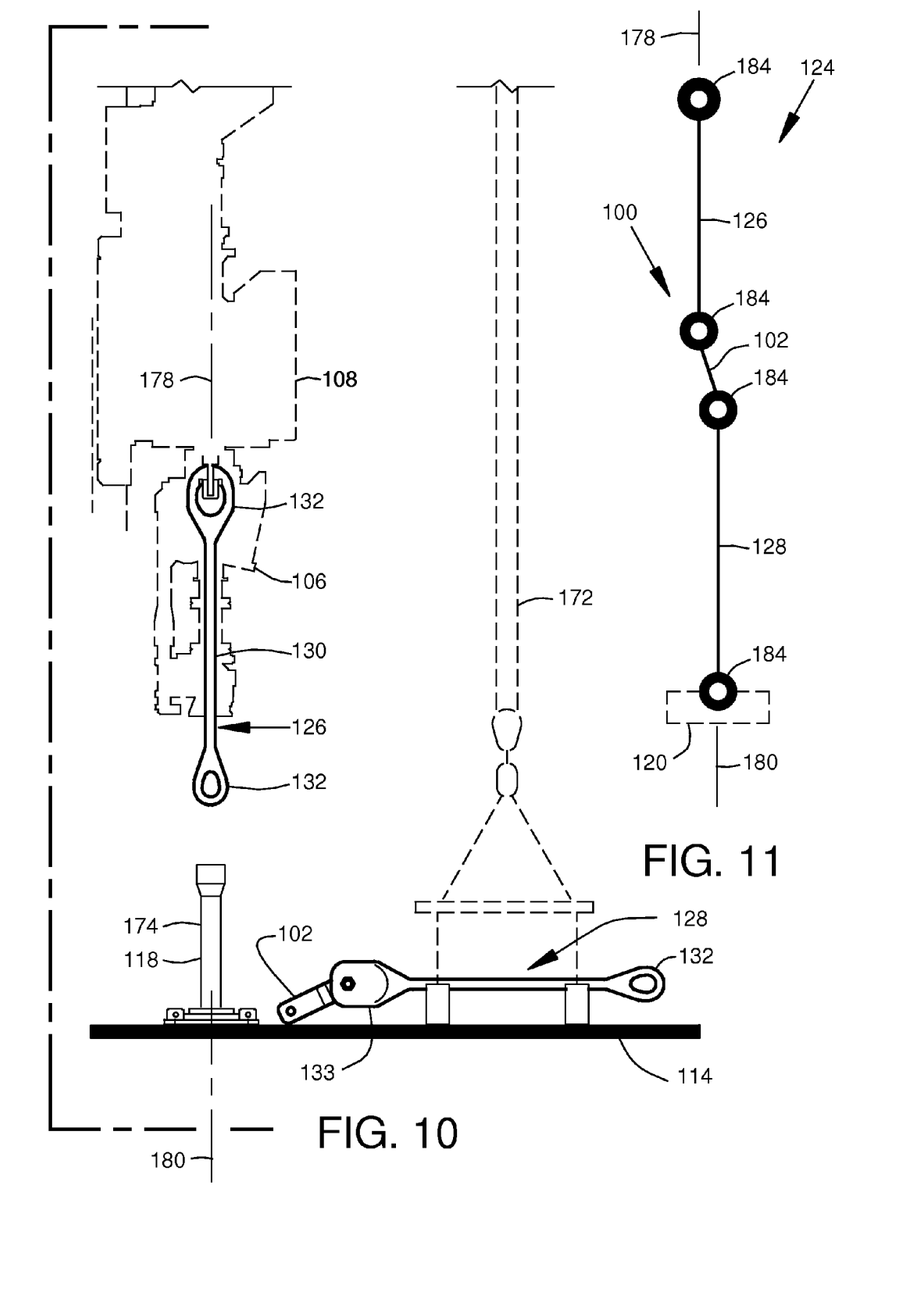
FIG. 10 shows a schematic diagram illustrating a rig floor supporting a secondary elevator extension bail and the bail extender device of FIG. 1 coupled to the secondary elevator extension bail.
FIG. 11 shows a free-body diagram illustrating degrees of freedom provided within an elevator-bail assembly equipped with the bail extender device of FIG. 1 of the present disclosure.

FIG. 10 shows a schematic diagrammatic illustrating rig floor 114 supporting a secondary extension bail 128 coupled to bail extender device 102. When an increase to the working distance X1 is required, the time and risks associated with a change-out of the primary elevator bails 126 can be avoided by adding a set of secondary extension bails 128 to the standard-length primary elevator bails 126 using bail extender device 102. An example method of using bail extender device 102 to extend the working distance of the bail assembly will now be discussed. A set of secondary elevator extension bails 128 are loaded onto the rig floor in proper orientation for installation. The secondary elevator extension bails 128 are oriented with bail couplers 133 located generally below the primary elevator bails 126 suspended from the top-drive unit 108. Bail extender device 102 is coupled with secondary extension bails 128 while secondary extension bails 128 are on rig floor 114. The coupling of bail extender device 102 with secondary extension bails 128 may be done while secondary elevator extension bails 128 are on the rig floor or prior to placing secondary extension bails 128 on rig floor 114. FIG. 10 depicts secondary extension bails 128 raised above ground on a riser. Secondary elevator extension bails 128 may be placed on such a riser or even on the ground (i.e., bail extender device 102 is connected and secured at or near ground level).

After each bail extender device 102 is coupled with a respective secondary extension bail 128, the top drive is lowered to place the eye-shaped loops 132 of the primary elevator bails 126 at an elevation allowing first coupler portion 138 of bail extender device 102 to be coupled to the lower eye-shaped loops 132 of the primary elevator bails 126. If needed, a hoisting line 172 or other handling apparatus may be used to adjust the position of the modified secondary extension bails 128 to facilitate assembly (with retaining pin 150 placed through the lower eye-shaped loops 132 and secured with internally-threaded nut 154 (see FIG. 4 and FIG. 5)). Once bail extender device 102 is coupled to the lower eye-shaped loops 132 of the primary elevator bails 126, top-drive unit 108 is raised to lift the resulting elevator-bail assembly 124 to an operable position (see FIGS. 2 and 3).

In another example method, bail extender device 102 may be first connected and secured to primary elevator bail 126 after the top drive has been lowered. Bail extender device 102 is connected to primary elevator bail 126 at or near ground level. For example, bail extender device 102 may be placed on the ground in position and the lower eye-shaped loops 132 lowered into the U-shaped throat 146 of bail extender device 102. A user can now secure bail extender device 102 to primary elevator bail 126 using at least retaining pin 150 and nut 154 (see FIG. 5), or another suitable securing device. Once secured to primary elevator bail 126, bail extender device 102 is connected and secured to secondary extension bail 128 with at least retaining bolt 159 and nut 154 (see FIG. 5), or another suitable securing device. The top drive unit is the raised to an operable position.

It is noted that in FIG. 10, a side view is illustrated such that only one bail extender device 102, one primary elevator bail 126, and one secondary extension bail 128 are shown. It is understood, however, that in practice, at least two bail extender devices 102 are each connected to two primary elevator bail 126 on opposite sides of the top drive. Additionally, two secondary extension bails 128 connect with the bail extender devices 102.

Rig alignment is essential for proper installation of tubing during drilling and casing operations. Casing, drill pipe and other similar tubular goods are customarily supplied in segments. These segments, often called "joints," are joined together at threaded end connections to form a continuous "string" of pipe. Proper alignment of the threaded connections must be maintained to prevent cross-threading or joint seizure.

Referring again to the diagram of FIG. 2 a tubular element 174, such as a section of drill pipe or casing 118 is suspended in elevator 120 and is lowered for threaded engagement with a section of drill pipe or casing 118 suspended in well bore 122. When drilling rig is initially placed on fresh ground, the weight of the rig can compress and compact the surrounding soil 176 resulting in tilting and shifting of the rig. Referring again to the diagram of FIG. 3, if the rig shifts, the rotational drive axis 178 of top-drive unit 108 can fall out of coaxial alignment with axis 180 of tubular element 174 suspended in well bore 122. Proper alignment should be maintained to prevent cross-threading. Such cross-threading can occur even when there is only a moderate misalignment between two adjacent joints of pipe.

FIG. 11 shows a free-body diagram, illustrating degrees of freedom provided within elevator-bail assembly 124, according to the preferred embodiment of FIG. 1. Compared to solid bails, the depicted elevator-bail assembly 124 provides at least two additional degrees of freedom between the distal connection points of the assembly. More specifically, elevator-bail assembly 124 depicted in FIG. 11 has four separate rotational joints 184. These additional degrees of freedom enable more consistent coaxial alignments of the tubular elements suspended within elevator 120 with the tubular elements suspended in well bore 122, even when a significant misalignment of the rotational drive axis 178 and axis 180 of the lower tubular 174 is present due to settling of the rig. This preferred arrangement is advantageous in avoiding or minimizing the potential for cross-threading, thus reducing costly delays.

Having thus described various implementations of the present invention, it will be apparent to those skilled in the art that various changes may be made to the configuration, operation and form of the invention without departing from the spirit and scope thereof. The above description along with the illustrations should not be construed as limiting the invention to those implementations described or illustrated. Practitioners skilled in the art will recognize numerous other embodiments or implementations as well.

What is claimed is:

1. An apparatus to extend a working length of an elevator assembly of a drilling rig, said apparatus comprising:
   a) a unitary body comprising
      i) a first coupling portion,
      ii) a second coupling portion, and
      iii) a transition portion connecting said first coupling portion with said second coupling portion;
   b) said first coupling portion extending away from said transition portion;
   c) said second coupling portion extending away from said transition portion in a direction opposite the direction that said first coupling portion is extending;
   d) a furthermost portion of said first coupling portion extending away from said transition portion defining a first end of said unitary body;
   e) a furthermost portion of said second coupling portion extending away from said transition portion defining a second end of said unitary body;
   f) said unitary body having a unitary-body-length measured from said first end of said first coupling portion to said second end of said second coupling portion;
   g) said first coupling portion comprising an opening that extends into said first coupling portion, said opening transitioning into a channel situated between a first projecting side member and a second projecting side member of said first coupling portion;
   h) said channel sized to receive an eye shaped loop portion of an elevator link;
   i) said first projecting side member comprising a first bore having an axis that is transverse to a longitudinal axis of said first projecting side member;
   j) said second projecting side member comprising a second bore having an axis that is transverse to a longitudinal axis of said second projecting side member;
   k) said first bore of said first projecting side member and said second bore of said second projecting side member aligned coaxially so that a fastener may pass through said first bore, into said channel, through the eye shaped loop of the elevator link, and through said second bore;
   l) said second coupling portion comprising a third bore, said third bore having an axis that is transverse to a longitudinal axis of said unitary body,
   m) said second coupling portion being connectable with a female end of a bail extension by way of a male-female connection; and
   n) said apparatus extends the working length of an elevator assembly of a drilling rig by the length of the unitary-body-length.

2. The apparatus of claim 1 wherein said apparatus connected with the elevator assembly adds at least one additional articulation point to the elevator assembly.

3. The apparatus of claim 1 wherein said channel comprises a U-shaped base.

4. The apparatus of claim 1 wherein said transition portion comprises a tapering transition from said first coupling portion to said second coupling portion.

5. A method of extending a working length of an elevator link assembly connecting a top drive assembly and a pipe-handling apparatus of a drilling rig, said method comprising the steps of:

a) selecting two fixed-length elevator links, each fixed-length elevator link comprising two eye shaped loop ends joined by a shank;
b) selecting two fixed-length bail extensions, each fixed-length bail extension comprising an eye shaped loop end and an opposing end comprising a fixed jaw clevis shaped structure, the eye shaped loop end and the opposing end joined by a shank;
c) selecting two apparatuses each apparatus structurally configured to couple one of the fixed-length elevator links with one of the fixed-length bail extensions, each apparatus comprising
  i) a unitary body comprising
    (1) a first coupling portion,
    (2) a second coupling portion, and
    (3) a transition portion connecting the first coupling portion with the second coupling portion,
  ii) the first coupling portion extending away from the transition portion,
  iii) the second coupling portion extending away from the transition portion in a direction opposite the direction that the first coupling portion is extending,
  iv) a furthermost portion of the first coupling portion extending away from the transition portion defining a first end of the unitary body,
  v) a furthermost portion of the second coupling portion extending away from the transition portion defining a second end of the unitary body,
  vi) the unitary body having a unitary-body-length measured from the first end of said first coupling portion to the second end of the second coupling portion,
  vii) the first coupling portion comprising an opening that extends into the first coupling portion, the opening transitioning into a channel situated between a first projecting side member and a second projecting side member of the first coupling portion,
  viii) the first projecting side member comprising a first bore having an axis that is transverse to a longitudinal axis of the first projecting side member,
  ix) the second projecting side member comprising a second bore having an axis that is transverse to a longitudinal axis of the second projecting side member,
  x) the first bore of the first projecting side member and the second bore of the second projecting side member aligned coaxially so that a fastener may pass through the first bore, into the channel, through the eye shaped loop of a fixed-length elevator link situated within the channel of the first coupling portion, and through the second bore, and
  xi) the second coupling portion comprising a third bore, said third bore having an axis that is transverse to a longitudinal axis of said unitary body,
d) connecting the fixed-length elevator links to a top drive assembly;
e) connecting the first coupling portion of a first apparatus with an eye shaped loop of a first fixed-length elevator link;
f) connecting the first coupling portion of a second apparatus with an eye shaped loop of a second fixed-length elevator link;
g) passing a first fastener through the first bore of the first apparatus, the eye shaped loop of the first fixed-length elevator link, and through the second bore of the first apparatus;
h) securing the first coupling portion of the first apparatus to the first fixed-length elevator link;
i) passing a second fastener through the first bore of the second apparatus, the eye shaped loop of the second fixed-length elevator link, and through the second bore of the second apparatus;
j) securing the first coupling portion of the second apparatus to the second fixed-length elevator link;
k) connecting the second coupling portion of the first apparatus with the fixed jaw clevis shaped structure of a first fixed-length bail extension by positioning the second coupling portion of the first apparatus between the fixed jaws of the fixed jaw clevis shaped structure of the first fixed-length bail extension;
l) securing the second coupling portion of the first apparatus to the first fixed-length bail extension;
m) connecting the second coupling portion of the second apparatus with the fixed jaw clevis shaped structure of a second fixed-length bail extension by positioning the second coupling portion of the second apparatus between the fixed jaws of the fixed jaw clevis shaped structure of the second fixed-length bail extension;
n) securing the second coupling portion of the second apparatus to the second fixed-length bail extension; and
o) connecting the eye shaped loop ends of the fixed-length bail extensions to a pipe handling apparatus.

6. The method of claim 5 wherein connecting the two apparatuses provides about an additional two feet of effective length to the elevator link assembly of a drilling rig.

7. The method of claim 5 further comprising the step of lowering the top drive assembly prior to connecting the fixed-length elevator links to the top drive assembly.

8. The method of claim 7 further comprising the step of connecting and securing the first coupling portion of the first apparatus to the first fixed-length elevator link and the first coupling portion of the second apparatus to the second fixed-length elevator link with the top drive assembly lowered.

9. The method of claim 7 further comprising the step of connecting and securing the first coupling portion of the first apparatus to the first fixed-length elevator link and the second coupling portion of the second apparatus to the second fixed-length elevator link with the first and second apparatus at or near ground level.

10. The method of claim 9 further comprising the step of connecting and securing the second coupling portion of the first and second apparatus to the first and second fixed-length bail extensions at or near ground level while the top drive is in a lowered position.

11. The method of claim 10 further comprising the step of raising the top drive assembly, along with the fixed-length elevator links and fixed-length extension bails connected and secured to the first and second apparatuses, to an operable height.

12. The method of claim 5 further comprising the step of connecting and securing the second coupling portion of the first and second apparatus to the first and second fixed-length bail extensions, at or near ground level, prior to connecting and securing the first coupling portion of the first apparatus to the first fixed-length elevator link and the first coupling portion of the second apparatus to the second fixed-length elevator link.

13. The method of claim 12 further comprising the step of connecting and securing the first fixed-length elevator link to the first coupling portion of the first apparatus, the first apparatus already being connected and secured to the first fixed-length bail extension, and the second fixed-length elevator link to the first coupling portion of the second apparatus, the second apparatus already being connected and secured to the second fixed-length bail extension.

14. The method of claim 13 further comprising the step of raising the top drive assembly, along with the fixed-length elevator links and fixed-length extension bails connected to the first and second apparatuses, to an operable height.

15. An apparatus comprising:
  a) an elevator link coupling portion comprising a channel that receives an eye shaped loop portion of an elevator link;
  b) said channel comprising flanking members that flank the eye shaped loop portion of the elevator link when the eye shaped loop portion of the elevator link is situated in said channel;
  c) said flanking members comprising at least one set of bores arranged coaxially and permitting passage of a first securing device through said at least one set of bores in said flanking members and also through the eye shaped loop portion of the elevator link when the eye shaped loop portion of the elevator link is situated in said channel;
  d) an elevator link extender coupling portion comprising a male member extending away from said elevator link coupling portion; and
  e) said male member structurally configured to insert into a fixed jaw clevis shaped structure of a bail extension having at least one set of bail extension bores arranged coaxially;
  f) said male member comprising at least one bore to permit passage of a second securing device though said at least one bore;
  g) said second securing device passes through the at least one set of bail extension bores and said at least one bore on said male member.

* * * * *